United States Patent [19]
Zangrando

[11] 3,874,934
[45] Apr. 1, 1975

[54] BATTERY FILLING DEVICE

[76] Inventor: Roy A. Zangrando, 43 Wenonah Ave., Lake Hiawatha, N.J. 07034

[22] Filed: Mar. 8, 1974

[21] Appl. No.: 449,430

[52] U.S. Cl. ............................................ 136/162
[51] Int. Cl. ............................................ H01m 7/00
[58] Field of Search ............ 136/90, 112, 113, 114, 136/162

[56] References Cited
UNITED STATES PATENTS
3,324,464    6/1967    Edwards et al. ................... 136/162
3,332,804    7/1967    Zaromb ............................. 136/113

FOREIGN PATENTS OR APPLICATIONS
167,333    6/1959    Sweden ............................. 136/162

*Primary Examiner*—Donald L. Walton
*Attorney, Agent, or Firm*—Robert P. Gibson; Nathan Edelberg

[57] ABSTRACT

A battery filling device which upon manual actuation of a pull ring, automatically transfers liquid electrolyte from a flexible storage container into the cells of a battery. The filling device comprises a housing having chambered sections therein separated by a manifold distributing section. The flexible container and the electrolyte therein are initially contained in an upper chamber. A portion of the container is positioned intermediate the coils of partially uncoiled portion of a spring metal sheet. The metal sheet is spring formed to roll itself into a cylindrical form when it is unrestrained. The coil is restrained from rolling up upon itself initially by the presence of the filled electrolyte container positioned thereon. Upon actuation of the pull ring, a spring biased valve opens an orifice in the storage container releasing the electrolyte therefrom. As the electrolyte disperses through the manifold section to the battery cells located in a lower chamber, the metal sheet coil squeezes the empty section of the flexible container flat so that the spring biased metal sheet can assume its cylindrical shape by rolling up the flexible container between its coils. The rolling action of the metal sheet helps to squeeze the electrolyte out of the orifice into the distribution manifold.

4 Claims, 3 Drawing Figures

PATENTED APR 1 1975 3,874,934

BATTERY FILLING DEVICE

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to fill batteries with an electrolyte. In the past each cell of the battery was filled individually by pouring the liquid directly from a holding container into the cell filling port or squirting the electrolyte therein with the aid of a squeeze bottle or syringe, this operation was both laborious and somewhat messy. In military applications the procedures for filling a battery as aforedescribed are unacceptable because under field conditions the time required for activating a battery may be very short, and the ability to carry along with the battery the extra equipment for holding the fluid electrolyte and dispensing it may be very limited. In addition since the filling ports of conventional batteries cannot be completely stoppered, the prior art battery must always be properly orientated to avoid spilling. The necessity of proper orientation of the prior art battery to avoid spilling of the electrolyte therefrom imposes an undesirable limitation on the use of military equipment having such prior art batteries.

SUMMARY OF THE INVENTION

The present invention relates to a battery filling apparatus which automatically dispenses an electrolyte to the cells of the battery upon removal of a locking pin. The apparatus comprises a housing having an upper and lower chamber separated by a manifold section. A flexible container for holding the electrolyte therein and a squeezing means are positioned within the upper chamber. A portion of the flexible container, which is collapsed and contains no electrolyte, is held intermediate the coils of a partially unrolled biased cylindrical coil spring. Upon opening of a spring biased valve a container output orifice is vented to the manifold so that the electrolyte can be dispensed, with the aid of the squeezing means, from the manifold to the individual cells of a battery located in the lower chamber of the housing. A pull ring attached to a locking pin holds the spring biased valve in a position which keeps the output orifice of the flexible container closed until such time as it is desired to fill the battery cells with electrolyte fluid.

An object of the present invention is to provide a battery filling device which will automatically dispense liquid electrolyte into the cells of a battery.

Another object of the present invention is to provide a battery filling device which uses a spring biased valve means to control the flow of the electrolyte into the battery cells.

Another object of the present invention is to provide a battery filling device which utilizes a flexible container to store the electrolyte fluid prior to its dispersal into the battery cells.

Another object of the present invention is to provide a battery filling device which utilizes a biased coiled flat spring for helping to squeeze the electrolyte from the flexible container.

Another object of the present invention is to provide a battery filling device which prevents the loss of electrolyte from the cells after activation as a result of changing orientation, vibration or temperature.

Another object of the present invention is to provide a battery filling device suitable to military application wherein the initiation of the electrolyte filling operation is reduced to a simple act of pulling a locking pin out of the device.

A further object of the present invention is to provide a battery filling device which is simple to manufacture and can be produced at a relatively low cost.

For a better understanding of the present invention, together with other and further objects thereof, reference is made to the following description taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figure 1:
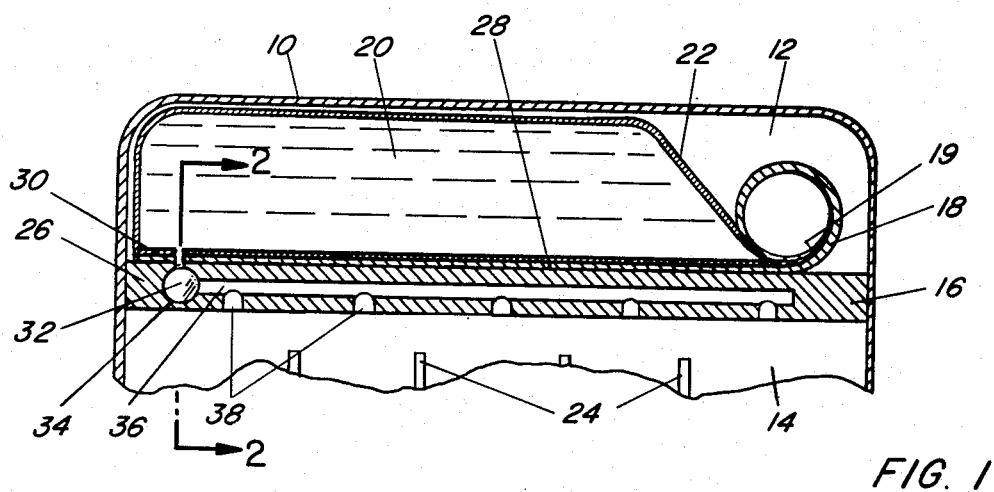
FIG. 1 is a partial cross-sectional view of the apparatus in an inactivated condition.
Figure 2:
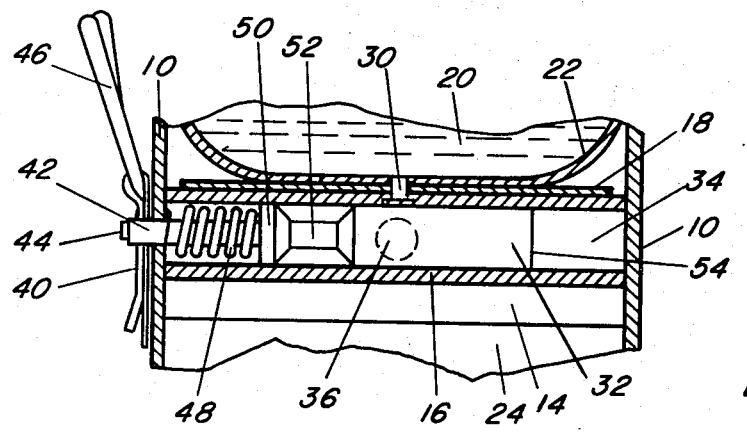
FIG. 2 is a partial cross-sectional view taken along line 2—2 of FIG. 1.
Figure 3:
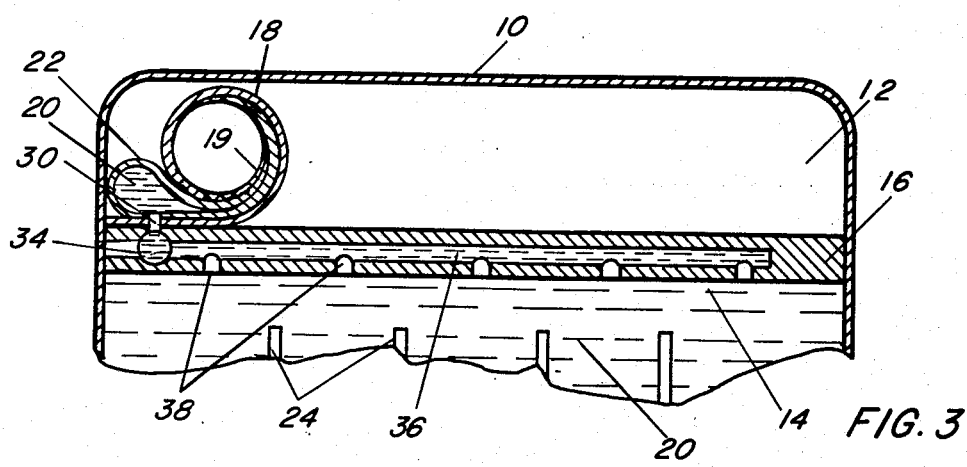
FIG. 3 is a partial cross-sectional view of the apparatus after actuation.

Referring now to FIGS. 1, 2 and 3 a housing 10 has an upper chamber section 12 and a lower chamber section 14 which are separated by a manifold section 16. A metal sheet 18 contained within upper chamber 12 is biased in such a manner as to tend to roll itself up into a cylindrical form. Metal sheet 18 is spring biased to provide the mechanical power necessary to transfer electrolyte 20 from flexible container 22 into battery cells 24 by squeezing container 22 within the cylindrical folds 19 of sheet 18. Metal sheet 18 has a width equal to that of manifold block section 16 and is fixed to the manifold block section at one end 26. FIG. 1 shows the metal sheet 18 in its partially unrolled condition with an unrolled portion 28 lying adjacent to the manifold block 16. Flexible container 22 when filled with electrolyte 20 as shown in FIG. 1 occupies most of the space between the metal sheet 18 and housing 10. A portion of flexible container 22 is rolled up between the cylindrical coils 19 of metal sheet 18. When flexible container 22 is filled with electrolyte 20 and has its outlet orifice 30 stoppered, the filled container 22 prevents the metal sheet 18 from rolling up into its natural cylindrical coil position as shown in FIG. 3. A biased piston 32 located in manifold valve bore 34, prevents the electrolyte 20 from flowing into manifold channel 36 and out of manifold ports 38 into battery cells 24 until such time as pin 40 is manually withdrawn from hole 42 of shaft 44. Pin 40 is connected to pull ring 46 to permit easy withdrawal of pin 40 from hole 42.

Piston 32 is closely fitted to manifold valve bore 34 in manifold section 16 which intersects both the outlet orifice 30 of electrolyte container 22 and manifold channel 36 thus preventing the flow of electrolyte 20 when the filling device is in the inactivated condition. Piston 32 has a shaft 44 on one end which extends through housing 10 and is biased to move to the right by spring 48 which is positioned around the shaft 44 and seated intermediate the housing 10 and the shoulder section 50 of piston 32. Piston 32 has a reduced diameter section 52 integrally connected therewith which in the inactivated condition is displaced from the outlet orifice 30. When the device is in the inactivated condition as shown in FIGS. 1 and 2, piston 32 prevents communication between outlet orifice 30 and manifold channel 36.

Activation of the battery filling device is accomplished by manually pulling ring 46 so that pin 40 is withdrawn from hole 42. Piston 32, under the bias provided by coil spring 48, moves to the right until the other end 54 of piston 32 comes into contact with housing 10. In the activated position, reduced section 52 is aligned with the outlet orifice 30 thus allowing the electrolyte 20 to escape from container 22 into manifold channel 36 to the manifold ports 38 and thence to battery cells 24. The release of electrolyte 20 from container 22 reduces the restraining force of the electrolyte filled container 22 on the rolled metal sheet 18. Metal sheet 18 returns toward its natural position and in so doing rolls up container 22 within its coils and forces the residual electrolyte 20 out of outlet orifice 30 through channel 36 into battery cells 24 via the outlet ports 38.

FIG. 3 shows battery cells 24 completely filled with electrolyte 20 which causes the pressure in the system to stabilize and restrain the metal sheet 18 from moving further. The biasing force applied by metal sheet 18 will retain the electrolyte 20 in the cells 24 regardless of battery orientation. Volume changes of the electrolyte 20 due to temperature variation or chemical reaction will be compensated for by movement of the rolled metal sheet 18.

The aforedescribed device is for application to a battery having a low conductivity electrolyte in which the common reservoir does not provide a significant current path between the cells to cause shorting. When it is desired to use highly conductive electrolyte, the same principle of distribution is applicable, but the electrolyte container would have a separate compartment for each of the cells. A ganged valve would operate each container individually and simultaneously.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by Letters Patent of the United States is:

1. A battery filling device which comprises:
   a housing having an upper chamber section and a lower chamber section;
   a manifold section separating said upper and lower chambers;
   a flexible container positioned in said upper chamber;
   a low conductivity electrolyte contained within said container when said device is in an inactivated condition;
   valve means for dispensing said electrolyte from said container to said lower chamber through said manifold section;
   means for squeezing said container and for forcing said electrolyte from said container when said valve means is actuated; and
   means for locking said valve means in a normally closed position when said device is in said inactivated condition.

2. A battery filling device as recited in claim 1 wherein said valve means comprises:
   a piston having a reduced section connected therewith, a shoulder section connected to said reduced section, a shaft axially connected to said shoulder section, said shaft protruding through said housing when said device is in its inactivated condition, said shaft having a transverse hole therein; and
   a coil spring positioned around said shaft intermediate said housing and said shoulder section for biasing said piston toward its activated condition.

3. A battery filling device as recited in claim 1 wherein said means for squeezing comprises a metal sheet located in said upper chamber section having a flat end fixed to said manifold section and a rolled end in the form of a cylindrical coil, said sheet being biased to roll itself into cylindrical form.

4. A battery filling device as recited in claim 2 wherein said means for locking comprises:
   a pin located in said transverse hole for preventing said valve means from activating said device; and
   a pull ring connected to said pin to permit easy manual withdrawal of said pin from said hole.

* * * * *